Nov. 13, 1934.     R. WOLF     1,980,737
RABBET PLANE
Filed Nov. 7, 1933
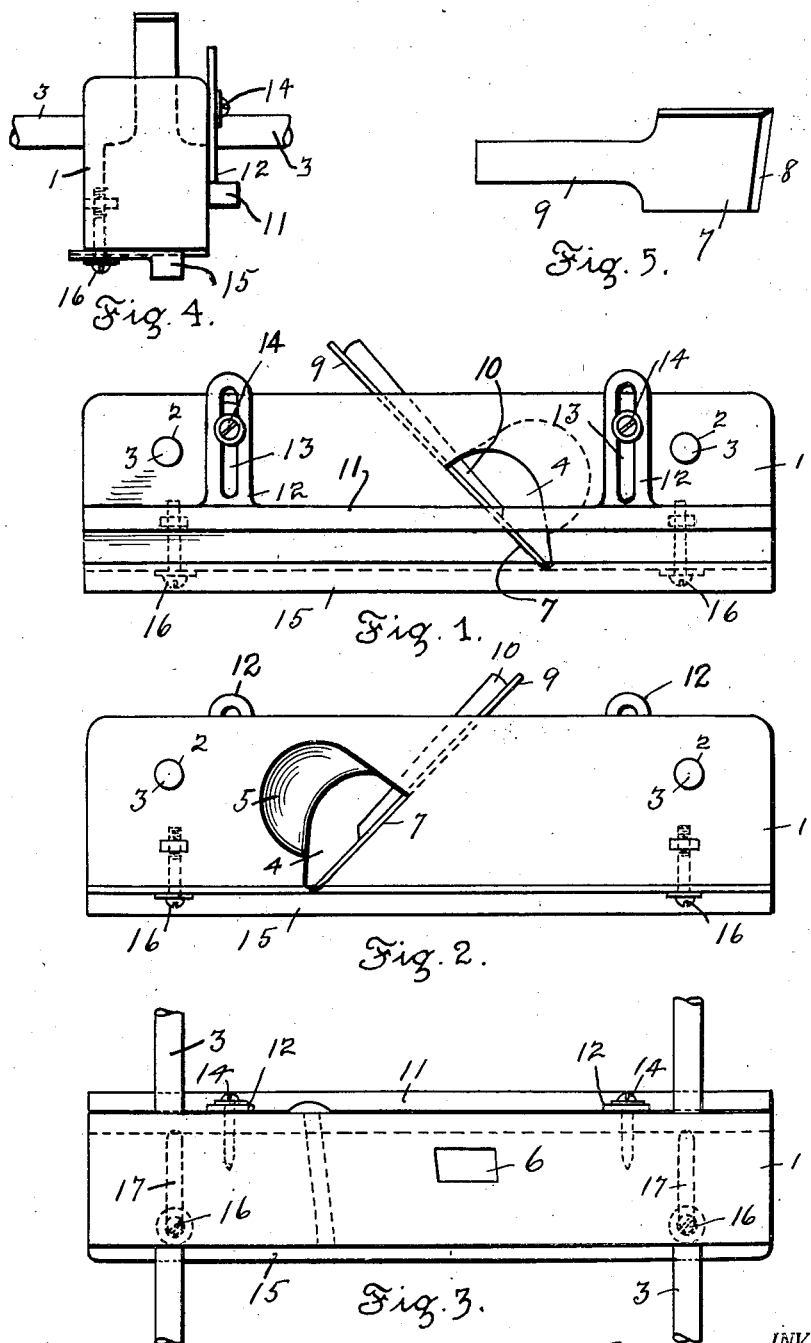
INVENTOR.
Rudolf Wolf
BY
ATTORNEY.

Patented Nov. 13, 1934

1,980,737

UNITED STATES PATENT OFFICE 1,980,737

RABBET PLANE

Rudolf Wolf, St. Thomas, Virgin Islands

Application November 7, 1933, Serial No. 697,021

1 Claim. (Cl. 145—20)

This invention relates to an improved rabbet plane, and has for its object to provide a simple and efficient device that can be readily adjusted for cutting a rabbet of any desired width and depth.

The invention consists of the novel construction and arrangement of the parts and combination of parts hereinafter more fully set forth in the following specification and pointed out in the appended claim.

In the accompanying drawing,—

Figure 1 is a side elevation of my invention.

Figure 2 is a side elevation taken on the opposite side from that shown in Figure 1.

Figure 3 is a top plan view of Figure 2, the cutting blade being removed.

Figure 4 is an end elevation of Figure 3.

Figure 5 is a plan view of the cutting blade.

Referring to the accompanying drawing, forming part of this specification, and in which like reference numerals designate like parts throughout the several views thereof, 1 designates the body of the plane, which in the present instance is formed of any suitable hard wood, and has a hole 2 in each end extending entirely through the body and in which are fitted the handles 3. The body 1 has an opening 4 extending entirely through from one side to the other and which is enlarged on one side at 5 to allow the shavings to pass out the side of the body, and an opening 6 extending upwardly from the opening 4 through the top of the body 1. The cutting blade 7 has a cutting edge 8 on one end and a contracted shank 9 on the other end. The blade 7 is inserted in the opening 4 at the bottom of the body 1 and its shank 9 projects up through the opening 6 and is held securely in position by the wedge 10. At the side of the body 1 is an adjustable depth gauge 11 having two upwardly projecting ears 12 each provided with an elongated slot 13. The said ears 12 lie flat against the body 1 of the plane and the gauge 11 is held securely in the adjusted position by the screws 14 which pass through the said elongated slots 13 and into the body of the plane. The gauge 11 is raised or lowered to permit the plane to cut the rabbet the desired depth. On the bottom of the body 1 of the plane is an adjustable width gauge 15 which can be moved back and forth on the bottom of the plane and which is held to the adjusted position by the screws 16 which project through the elongated slots 17 and into the body of the plane. The gauge 15 can be adjusted back and forth to permit the plane to cut the rabbet the desired width. This gauge 15 is preferably made of wood as it rests against the cutting edge of the blade 7, which cutting edge 8 extends slightly below the body of the plane so that the cutting can be done as the plane is drawn back and forth over the surface to be cut.

It will be seen from the foregoing that by adjusting the side and bottom gauge, the plane can be set to cut a rabbet of any desired width and depth.

Having thus described my invention, what I claim is;

A rabbet plane comprising a body having a hole at each end extending entirely through the body from opposite sides, a removable handle projecting through the holes and extending beyond the sides thereof, an opening extending through the body from one side to the other and an opening extending upwardly from said second named opening and through the top of the said body, a cutting blade secured in said last named opening, an adjustable depth gauge on one side of the body and having ears projecting upwardly therefrom and each provided with an elongated slot, a screw projecting through each of said elongated slots to hold the said depth gauge in the adjusted position on the body, an adjustable width gauge on the bottom of said body and provided with elongated slots therein, and a screw extending through each of said elongated slots to hold the said width gauge in the adjusted position on the bottom of the body.

RUDOLF WOLF.